UNITED STATES PATENT OFFICE.

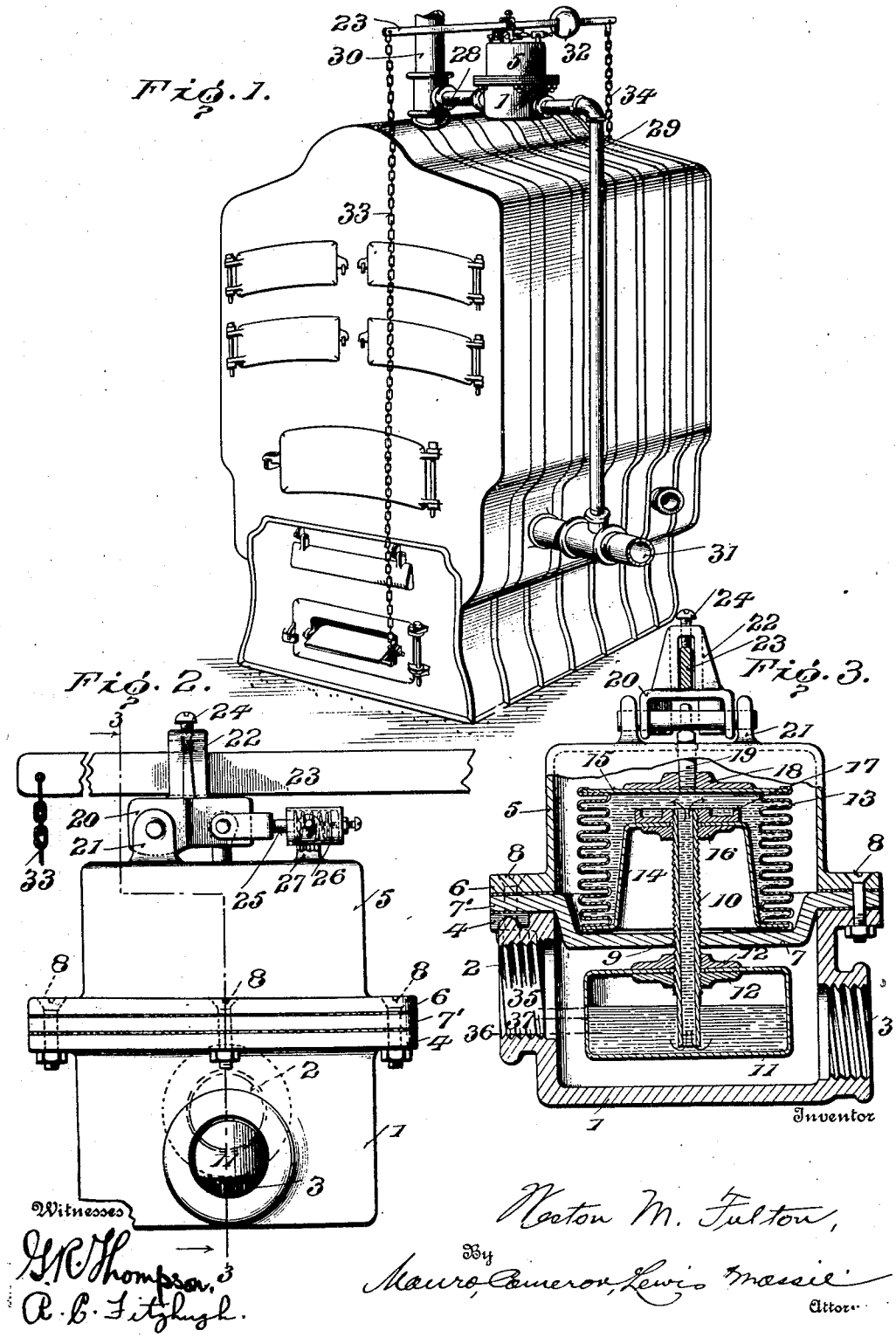

WESTON M. FULTON, OF KNOXVILLE, TENNESSEE, ASSIGNOR TO THE FULTON COMPANY, OF KNOXVILLE, TENNESSEE, A CORPORATION OF MAINE.

THERMOSENSITIVE DEVICE FOR AUTOMATIC TEMPERATURE-REGULATORS.

No. 904,123.  Specification of Letters Patent.  Patented Nov. 17, 1908.

Application filed March 11, 1907. Serial No. 361,723.

*To all whom it may concern:*

Be it known that I, WESTON M. FULTON, of Knoxville, Tennessee, have invented a new and useful Improvement in Thermosensitive Devices for Automatic Temperature-Regulators, which invention is fully set forth in the following specification.

This invention relates to improvements in thermosensitive devices for automatic temperature regulators, and more particularly to that class of regulators which respond to changes of temperature in the heating fluid of a hot-water or steam heating system and control the air supply to the fuel which constitutes the source of heat, and the invention has among its principal objects to provide a thermosensitive device of the class referred to which will respond readily to small changes in temperature, while being capable of operating over a wide range of temperatures, which will give large motion and power to the power-transmitting means operating the draft-dampers, and which will be very durable and efficient.

Heretofore efforts have been made to automatically control the temperature of hot water and of steam in hot-water and steam heating-systems by variations of vapor-pressure of a volatile liquid confined in a vessel which is affected by the changes of temperature of the hot water or steam, said vapor entering and actuating a collapsible and expansible vessel to impart movement to valves or dampers controlling the air-supply to the furnace. In operation, the changes of temperature in the heating fluid, such as that of hot water, cause a variation of vapor tension above the surface of the volatile liquid in the vessel which is in immediate contact with the heating-fluid. The collapsible and expansible chamber, however, which communicates with the vapor space above the volatile liquid in the containing vessel not being exposed to the heat of the fluid surrounding the said vessel tends to retain its temperature and that of the vapor therein unchanged. As a consequence when the temperature of the heating-fluid rises and the vapor tension above the liquid increases the tension of the vapor within the collapsible and expansible vessel being now less than that in the said vessel, the molecules or particles of warm vapor possessed with greater energy gradually commingle with the cooler particles in the collapsible and expansible vessel. Partial condensation of the incoming vapor results, with a gradual rise of temperature partly due to latent heat liberated in the act of condensation and partly heat of convection. Finally the temperature in the collapsible and expansible vessel rises to that of the vapor in the volatilizing vessel and the tension of vapor in the two vessels will be the same and the first-named vessel will expand and close the valve. The movements of extension of the collapsible and expansible vessel therefore materially lag behind the changes of pressure in the vapor generator and thereby render the device sluggish and prevent it from controlling the temperature of the heating-fluid within narrow limits of fluctuation. Likewise, fall of temperature in the heating media is followed by a tardy contraction or collapsing of the flexible vessel. Beside the sluggish action which devices of the kind referred to possess in responding to changes in the temperature of the heating medium, they also have at times erratic movements. It is well-known that if a saturated vapor be confined in a chamber at any particular temperature the vapor may be cooled considerably below the point of condensation of the vapor at the given pressure, provided the contents of the chamber are not agitated. If for any reason the contents are disturbed by agitation, sudden condensation takes place in the vapor. This is particularly characteristic of vapors of alcohol, benzene, chloroform, and volatile substances often used in thermosensitive devices. Further, it is well-known that when a volatile liquid in a quiescent state is gradually heated it may even attain a temperature above its boiling point and when disturbed suddenly develop an explosive vapor pressure. Both of the described conditions cause not only a delayed action in the collapsible and expansible vessel, but, when action takes place, it is irregular and detracts from the efficiency of the device.

If it be attempted to overcome the objectionable feature of condensation in the motor vessel by maintaining its temperature that of the heating fluid, this temperature often attains in steam heating systems a degree which will gradually draw the temper from the metal of the flexible walls of the motor vessel and decrease its resilience and lower its elastic limit, thereby resulting in a rapid deterioration of the wall, causing it to wear out and crack.

In order to overcome the above objections and secure the advantages of my invention, I have devised improved means whereby changes of pressure of a saturated vapor from a volatile liquid, which is held in heat interchanging relation with the fluid whose temperature is to be regulated, cause the movement of a liquid piston to actuate without delay a collapsible and expansible vessel to impart motion to a damper or valve. As a volatile fluid I may employ any liquid sensitive to slight changes of temperature and whose vapor tension varies uniformly within the range of temperature of the fluid whose temperature is to be controlled. For example, in the case of hot-water heating, chloroform is a suitable liquid for the purpose, since its vapor tension varies uniformly within the limits of hot-water heating, and it is sensitive to slight changes of temperature. I preferably transmit the power of the vapor pressure to the collapsible and expansible vessel through the medium of the same liquid as is used for supplying the vapor, though I may use a different liquid for transmitting the power from that used for supplying the vapor, such as water and chloroform, two liquids of different density not miscible with each other.

The inventive idea involved may be embodied in a variety of mechanical forms, and for the purpose of illustration, I have shown one of these forms in the accompanying drawings; but it is understood that such drawings are designed for the purpose of illustration only, and not as defining the limits of the invention.

Figure 1 is a perspective view of my improved damper-regulator mounted on a boiler. Fig. 2 is a view partly in elevation and partly in broken section, showing the regulator detached. Fig. 3 is a view partly in elevation and partly in central vertical section, on the line 3—3, of Fig. 2.

Referring to Fig. 3, I have illustrated one form of regulator in which the body of the regulator consists of a lower bowl portion or member 1 of cast metal, such as cast-iron, having threaded side openings 2 and 3 for connection with steam or hot-water pipes, and flange 4 for securing member 1 to an upper cap member 5 of cast metal, the walls of which are preferably thinner than those of the bowl 1 and provided with a flange 6. The casing formed by the walls of the bowl 1 and cap 5 is divided into an upper and lower chamber by means of a dished-shaped partition 7 having a flange 7' around its outer periphery adapted to be received and held between flanges 4, 6 of the bowl and cap by bolts 8, 8. Gaskets of rubber or metal may be inserted between the flanges in a manner well understood for making the joints water or steam tight. Partition 7 is provided with a central threaded opening 9 for receiving a threaded tube 10 fitting water-tight therein. A vapor pressure bulb 11 is secured to the lower end of tube 7 to make a water-tight connection therewith, as by means of screw-threaded flange plates or washers 12, 12, one resting against the inner side of the top wall of the bulb and the outer one movable into clamping position against the upper wall to help hold the same securely on pipe 10. The end of tube 10 opens into bulb 11 and terminates near the bottom thereof.

Supported on partition plate 7 within the upper chamber of the casing is a collapsible and expansible vessel 13 having a flexible corrugated outer side wall and rigid end walls 14 and 15. The lower wall 14 is deeply reëntering and forms a dead air-space above the top wall 7 of the bowl 1, the function of which will clearly appear below. The end wall 14 is secured to the upper end of pipe 10 and makes a fluid-tight joint therewith by means of screw-threaded flange plates 16, 17, which hold the wall tightly in contact with pipe 10 in a manner similar to that described above. The upper flange 17 may be similar to flange 16, or it may be recessed as shown, without detracting from its strength, the raised outer rim of the flange serving in this case to arrest the downward movement of end-wall 15 when the vessel is collapsed to the requisite degree. A flange plate 18 made fast to end wall 15 as by soldering or brazing, receives the screw-threaded end of a plunger 19 which transmits the movements of the flexible wall 13 to power transmitting means operating, for example, the dampers of a furnace, as shown in Fig. 1.

In the drawings I have shown my regulator in connection with a lever-supporting rocker and compensating device which forms the subject-matter of my co-pending application Sr. No. 298,713, filed January 30th, 1906, and only so much of the rocker and compensating device will be here described as is necessary to a proper understanding of the same, as they are not a part of the invention herein claimed. It is to be understood, however, that my regulator is not restricted to use with such rocker and compensating device, as it is capable of use independently of these devices and in other relations. The rocker 20 comprises a casting having side walls and a connecting top member, and is hinged on supporting lugs 21. Standards 22 receive and hold fast the damper lever 23 by aid of a set screw 24. One end of the rocker 20 is made narrow for the purpose of receiving the forked end of a spring-pressed plunger 25 working in the barrel 26 of the compensating device which latter is mounted to rock in supporting lugs 27. The free end of the regulator plunger 19 is loosely connected to the forward end of the rocker and as it moves up and down with the movement of wall 15 oscillates the rocker 20 and with it the lever 23.

Plunger 25 of the compensating device, when the damper lever is in a horizontal position, exerts no force in a vertical direction, but as soon as the lever is tilted in either direction the thrust of the spring-pressed plunger 25 furnishes a vertical component either up or down to assist the compression or extension of the collapsible and expansible vessel.

In Fig. 1 I have shown a water-heating boiler provided with my regulator which communicates with the boiler through its opposite and horizontally displaced openings 2, 3, by means of small conduits 28 and 29 tapping the out-flow and return pipes 30 31 of the boiler.

The damper-lever 23 carries the usual counterpoise weight 32, and is connected to the front and rear dampers of the furnace through flexible connections 33 and 34.

The operation of the device thus far described is as follows: The parts of the regulator having been assembled and the flexible vessel and bulb supplied with a non-inflammable volatile liquid, such as chloroform, in quantity sufficient to fill the flexible vessel and tube 10 and to partially fill the bulb to close the lower end of tube 10, the bowl 1 of the regulator is connected up with the out-flow and return pipes 30, 31 of the boiler in the manner shown in Fig. 1. The lower opening 3 of the bowl is connected to the return pipe 31 and the upper opening 2 with the out-flow pipe 30. I find that a more satisfactory flow through the bowl is thereby secured. The damper-lever 23 is inserted in the slot of the rocker 20 and adjusted in proper position in relation to the dampers and secured therein by set screw 24. The ends of the lever are connected to the damper-chains 33, 34 attached to the front draft damper of the boiler and the check damper in the smoke-hood at the rear of the boiler. The regulator is now set, for example, to maintain a temperature of 150° F. in the fluid passing through the bowl 1, by moving weight 32 along damper-lever 23 until its pressure acting through the lever 23, rocker 20 and plunger 19 against the upper wall 15 of the flexible vessel, just balances the upward pressure exerted against wall 15 by the liquid which is forced out of bulb 11 by the tension of the saturated vapor in the space above the surface of the liquid in bowl 1. The liquid will finally stand at level 35, for example. Now, if the temperature of the water of the heating system rises for instance to 151° F. the vapor above the liquid in the bulb 11 will expand slightly depressing and disturbing the liquid and exposing a thin film on the walls, thus starting rapid evaporation. The vapor so formed will exert an increased pressure upon the surface of the liquid, lower its level to line 36, for example, and force some of the liquid out through pipe 10 up into the flexible vessel and thereby forcing wall 15 upward, causing rocker 20 to tilt and with it the damper-lever to shift the dampers. The supply of air to the fuel in this instance will be reduced, checking combustion and thereby lowering the temperature of the heating fluid to the original temperature of 150° F. The combustion of fuel being thus arrested, the temperature of the water in the heating system will soon begin to fall, whereupon the vapor in bulb 11 will be somewhat cooled and thus permit condensation to take place under the pressure exerted by weight 32 against end wall 15 of the flexible vessel, as already pointed out, and some of the liquid in the vessel will thus be forced back into bulb 11 so that the level of the liquid will now occupy line 35, and the dampers of the boiler will be shifted in the opposite direction to that just described, and thereby permit a further combustion of fuel.

It is to be observed that in the operation of my regulator just described the movement of the upper wall of the flexible vessel instantly follows the changes in tension of the vapor above the surface of the volatile liquid in bulb 11, and therefore the changes of temperature of the fluid surrounding the bulb. All sluggishness of action in my device is avoided. There is no tendency for the vapor in the presence of its liquid to tend towards sluggishness in condensing and reforming, as the temperature is slowly raised or lowered, for the reason that by virtue of the construction of the regulator the liquid in contact with the vapor is agitated the moment there is a change of temperature of the heating fluid surrounding the bulb 11. This will be evident from the fact that when, for instance, the temperature of the heating fluid rises, the vapor in bulb 11 expands according to the well-known law of expansion of vapors. This expansion is independent of the expansion accompanied by formation of additional vapor from the surface of the liquid and immediately effects a transfer of some of the liquid in bulb 11 through pipe 10 to the flexible vessel and thereby sets into agitation the liquid in the bulb. This transfer of liquid and resulting agitation is further hastened by the rapid formation of vapor from the capillary film of liquid wetting the sides of the bulb as the receding surface of liquid falls to line 36. The cumulative effect of the resulting vapor pressure coöperates with that due to the expansion of vapor in the bulb to set up a flow of the liquid and maintain its agitation. The vapor in contact with its liquid has therefore little opportunity to act sluggishly in forming or condensing as the temperature of the heating fluid slowly changes.

As a further means for maintaining an agitation of the volatile liquid in the bulb and avoiding sluggishness of action of the regulator, I have provided a dead air-space below the bottom wall 14 of the collapsible vessel and above the partition wall 7 which separates the cap 1 from the cap 5. The air in this space acts to prevent the flexible vessel from receiving heat from plate 7 and assists thereby in maintaining this vessel at a lower temperature than that of the heating fluid in the bowl 1. To further assist in reducing the temperature of the flexible vessel the walls of the protecting cap 5 are made thin to facilitate the escape of heat radiated from the extended surfaces of the deep corrugations of the vessel.

The liquid in the flexible vessel remains at all times relatively cool as compared with the liquid in bulb 11. As a result the cooler liquid in the upper vessel continually tends to descend and that in the bulb to rise to take its place. Even while the temperature of the heating fluid is stationary the liquid in the bulb is continually agitated. This cooler body of liquid in the upper vessel performs another important function in that it hastens the action of the regulator in responding to a falling temperature of the heating fluid. When the temperature of the latter falls contraction takes place in the vapor of the bulb followed by an inflow of cooler liquid from the upper vessel which causes a more rapid condensation of vapor and facilitates and hastens contraction of its volume and collapsing of the vessel. From what precedes it is evident that whether the temperatue of the circulating fluid in bowl 1 rises or falls even in a slight degree, the regulator promptly responds to such changes.

While I have described my improvement as peculiarly adapted for use in damper regulators I desire it to be understood that it may be used in other relations, such as to control a valve in a steam or hot-water pipe where the flow of such fluid is dependent on the variation of temperature of the same or another fluid.

What is claimed is:—

1. In a thermosensitive device of the character described, the combination of a fluid pressure chamber having a casing for holding a heating fluid, a collapsible and expansible vessel having a reëntering bottom wall mounted above said casing and forming therewith a closed air chamber, a conduit connecting said chamber and vessel, said vessel and a portion of said chamber being filled with a liquid subject to the fluid pressure in said chamber.

2. In a thermosensitive device of the character described, a fluid pressure chamber, a casing for the same having an inlet and outlet, a collapsible and expansible vessel having deep corrugations to facilitate radiation of heat, and a reëntering bottom forming with one wall of said casing a dead air-space, a conduit connecting said vessel and chamber, and a cap inclosing said vessel.

3. In a thermosensitive device of the character described, the combination of a vapor pressure chamber having a casing provided with an inlet and outlet for a heating fluid, a collapsible and expansible vessel having a reëntering bottom wall mounted above said casing and forming therewith a closed air chamber, a conduit connecting said chamber and vessel, said vessel conduit and a portion of said chamber being filled with chloroform subject to the changes of vapor pressure in said chamber to actuate said vessel.

4. In a thermosensitive device of the character described, the combination of a fluid pressure chamber having therein chloroform partly filling the same, a collapsible and expansible vessel having communication therewith and filled with a liquid having a density that of or less than chloroform, a casing for said chamber having a heating fluid inlet and outlet, one wall of said casing forming with one wall of said vessel a closed air chamber.

5. In a thermosensitive device of the character described, the combination of a fluid pressure chamber having therein chloroform partly filling the same, a collapsible and expansible vessel having communication therewith and filled with a liquid having a density that of or less than chloroform, a casing for said chamber having a heating fluid inlet and outlet, one wall of said casing forming with one wall of said vessel a closed air chamber, and a casing for said vessel having thin walls for dissipating heat.

6. In a thermosensitive device of the character described, the combination of a thermosensitive fluid-containing receptacle subject to the changes of temperature of a heating medium, a fluid-containing collapsible and expansible metallic motor vessel having a conduit opening into said receptacle at or near the bottom thereof and actuated by the changes of fluid pressure in said receptacle, a casing surrounding said receptacle, one wall of said casing inclosing with one wall of said vessel a heat-retarding substance.

In testimony whereof I have signed this specification in the presence of two subscribing witnesses.

WESTON M. FULTON.

Witnesses:
W. D. JUDKINS,
E. J. S. HYATT.